United States Patent [19]

Proctor

[11] 4,416,260
[45] Nov. 22, 1983

[54] SOLAR HEATING SYSTEM FOR GREENHOUSES AND THE LIKE

[75] Inventor: Budd L. Proctor, Manchester, Mo.

[73] Assignee: PSI Energy Systems, Inc., Fenton, Mo.

[21] Appl. No.: 310,898

[22] Filed: Oct. 13, 1981

[51] Int. Cl.³ .............................................. F24J 3/02
[52] U.S. Cl. .................................. 126/429; 126/430; 126/431; 126/436; 126/400
[58] Field of Search ............... 126/400, 437, 426, 436, 126/429, 430, 431; 98/40 C; 165/104.21

[56] References Cited

U.S. PATENT DOCUMENTS

| | | | |
|---|---|---|---|
| 3,520,244 | 7/1970 | Gaines et al. | 98/40 C X |
| 3,719,136 | 3/1973 | Criddle | 98/40 C X |
| 3,902,474 | 9/1975 | Pyle | 126/422 |
| 4,051,999 | 10/1977 | Granger et al. | 126/400 X |
| 4,088,266 | 5/1978 | Keyes | 126/400 X |
| 4,099,558 | 7/1978 | Bricard et al. | 126/400 X |
| 4,103,825 | 8/1978 | Zornig | 126/400 X |
| 4,111,185 | 9/1978 | Swann | 126/400 X |
| 4,141,498 | 2/1979 | Marschner | 126/437 X |
| 4,192,454 | 3/1980 | Rugenstein | 126/437 X |
| 4,196,719 | 4/1980 | Skrivseth | 126/430 |
| 4,201,192 | 5/1980 | Coxon et al. | 126/422 |
| 4,203,424 | 5/1980 | Coxon et al. | 126/422 |
| 4,213,447 | 7/1980 | Erickson | 126/429 |
| 4,223,721 | 9/1980 | Schoenfelder | 126/400 X |
| 4,244,148 | 1/1981 | Chabanon et al. | 126/400 X |
| 4,244,519 | 1/1981 | Zornig et al. | 126/430 |
| 4,291,674 | 9/1981 | Comte et al. | 126/437 X |
| 4,294,228 | 10/1981 | Kruger et al. | 126/430 |
| 4,307,701 | 12/1981 | Balon et al. | 98/40 C X |

*Primary Examiner*—Samuel Scott
*Assistant Examiner*—Randall L. Green
*Attorney, Agent, or Firm*—Glenn K. Robbins

[57] ABSTRACT

A solar heating collector is employed in the form of a plenum constituted of the greenhouse translucent roof and a roof floor of black plastic sheeting. Hot air from the plenum is distributed by air directing means to a heat storage chamber in a charge cycle or directly to the greenhouse in a direct heat cycle. In a discharge cycle air from the greenhouse is directed through the heat storage chamber to be heated and discharged into the greenhouse. Specially designed collapsible tubes are employed in the system for distribution of exhaust air and distribution of heated air from a manifold. The heat storage chamber employs cylindrical containers of a phase change material to store solar energy and serves to support the air directing means and the aforementioned collapsible tubes to provide a central unit for providing and monitoring solar heat distribution.

7 Claims, 12 Drawing Figures

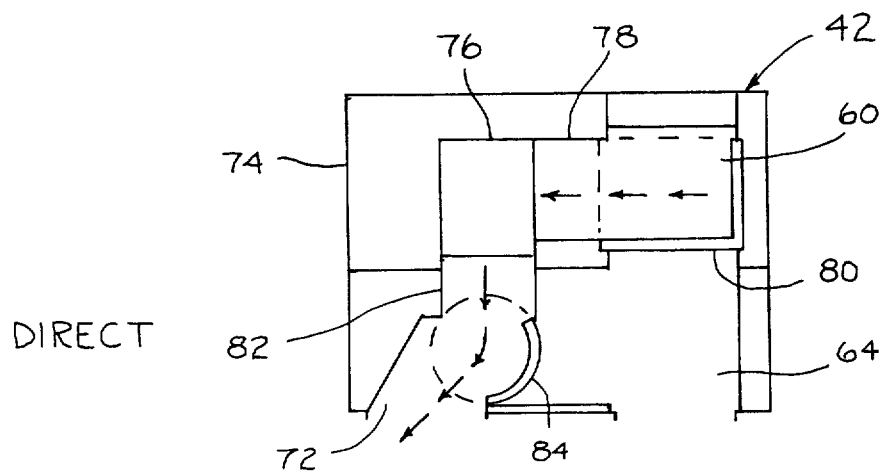
FIG. 9 DIRECT
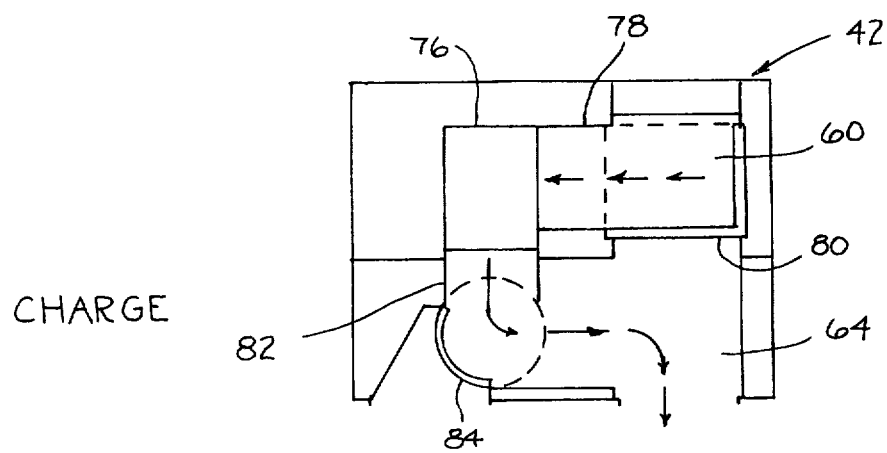
FIG. 7 CHARGE
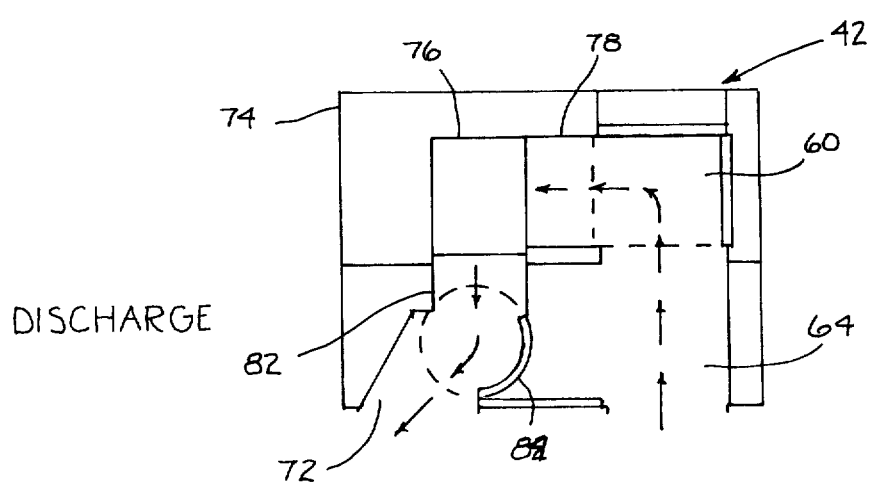
FIG. 8 DISCHARGE

DIRECT

SOLAR HEATING SYSTEM FOR GREENHOUSES AND THE LIKE

BACKGROUND OF THE INVENTION

In the past various types of solar heating systems have been devised for heating building structures. Generally these systems have employed a solar collector of one type or another employed with duct work and blowers for distributing heat directly from the solar collector to the building or a heat storage unit such as rock or thermal energy storage units which contain a phase change material for high heat storage capacity. Heat from the heat storage unit may be recaptured by directing air thereover and recycling to the building when needed.

It has been a particular problem to heat greenhouses and similar spacious buildings because of the high heat loss in cold weather. Such greenhouses, while absorbing a substantial amount of heat in cold sunny days through passive solar absorbtion rapidly lose their heat at night fall. This rapid heat loss is due to the nature of construction of roof and walls of glass or translucent plastic and also because of the spaciousness of the interior.

It will further be understood that in such greenhouses certain areas containing different types of plants may require warmer temperatures than other areas which may contain hardier plants or otherwise may not require as warm a temperature.

While various solar heating systems have been proposed, it has continued to be a problem to devise efficient and practical solar heating systems for greenhouses and similar buildings of spacious interior.

SUMMARY OF THE INVENTION

By means of the instant invention there has been divised a solar heating system for greenhouses and the like which takes advantage of the translucent nature of the roof to provide a solar collector using a black plastic sheet as a plenum boundary or floor. A self contained air directing means and heat storage chamber is employed within the greenhouse with flexible and collapsible conduits for heat exhaust and heat distribution from a hot air manifold. Through the use of flexible heat distribution conduits the heated air can be distributed as desired to those areas of the greenhouse that require heat.

The solar collector plenum essentially employs the peaked roof of the greenhouse having translucent roof walls to provide a plenum space to be heated by radiation. The black plastic sheet stretches from one side of the roof to the other or from a point low on a south wall to the peak providing an inclined plenum and serves to absorb heat from the sun. The heat from the solar collector plenum is employed to store heat in a heat storage chamber in a charge cycle when the greenhouse does not need heat or can be employed in the greenhouse in a direct heat cycle. When heat is needed from the heat storage chamber, air is directed from the greenhouse through the heat storage chamber to be heated and is then returned to the greenhouse. It will also be understood that this heat disctribution may be in a separate building as desired by simply extending the duct work and hot air manifold thereto.

The solar collector plenum thus serves as a simply contructed chamber utilizing existing translucent roof walls of the greenhouse and requires only the addition of the black plastic sheet which may be any conventional plastic sheet material such as polyethylene or the like. The solar collector plenum further serves as a source of insulation during periods of heat requirement such as night fall or the like. The black plastic sheet serves as a heat protective ceiling for the greenhouse to minimize heat escape from the interior of the greenhouse.

The heat storage chamber and air directing means are constructed as a central physically connected central unit to provide for ease in monitoring the various heat cycles and servicing of the heat distribution system. By appropriate duckwork the air directing means is connected to the heat storage chamber and the heat distribution manifold. The air directing means is constituted of a valve system for directing the air by a blower in the charge cycle where hot air from the solar collector plenum is directed to the heat storage chamber to provide heat thereto. A discharge cycle is employed by the air directing meeans in which air from the greenhouse is drawn through the heat storage chamber and is then directed through a hot air manifold for distribution to the greenhouse. A direct heat cycle is furnished in which the air directing means draws air from the solar collector plenum and distributes it directly to the hot air manifold.

The hot air manifold is comprised of a laterally extending header conduit which is connected to a plurality of flexible collapsible plastic conduits which may be of polyethylene or other conventional plastic. These conduits are provided with perforations or openings along their length to provide for distribution of heat as desired. The conduits may be positioned as desired in appropriate locations on the floor of the greenhouse to provide heat to selected areas.

In order to provide for efficient utilization of exhaust air from the heat storage chamber in the charge cycle a collapsible flexible exhaust tube is connected to an opening in the storage chamber. The exhaust tube may be positioned on the floor of the greenhouse and terminate underneath an opening in the black plastic sheet at an area of the greenhouse remote from the heat storage chamber. In this way exhaust heat may be recycled to the solar collector plenum for full efficiency.

The exhaust tube is collapsible in order that it close in the discharge cycle where air is drawn through companion ports communicating with the exhaust outlet in the heat storage chamber. The companion ports in the charge cycle are closed by a damper which is opened by negative air pressure and closed by positive pressure.

The heat storage chamber serves as a base or foundation for the solar heat collecting system with the solar collecting plenum and serves as a central area for servicing and monitoring the system. It is constructed of an insulated box-like housing with interiorly staggered baffles to provide a tortuous path between an outlet at one side communicating with the air directing means and another oulet at a far side of the housing communicating with the aforementioned exhaust conduit and companion ports. The passageway is filled with polyethylene containers of a phase change material such as calcium chloride hexahydrate to provide an efficient high heat capacity thermal energy storage chamber.

The aforedescribed solar heating system may be simply installed in greenhouses or the like in a simple efficient and low cost manner without the requirement of complex reconstruction and ductwork. While a greenhouse building has been particularly described it will be understood that other like structures of a spacious interior may be similarly utilized.

The above features are object of this invention. Further objects will appear in the detailed description which follows and will be otherwise apparent to those skilled in the art.

For the purpose of illustration of this invention, a preferred embodiment is shown in the accompanying drawing. It is to be understood that this is for the purpose of example only and that the invention is not limited thereto.

IN THE DRAWING

FIG. 7 is a schematic view of a flow control unit for distribution of solar heated air to the heating storage unit in a charge cycle;

FIG. 8 is a view of the flow control unit for distribution of heated air from the heat storage unit to the greenhouse in a discharge cycle;

FIG. 9 is a view of the flow control unit for distribution of solar heated air to the greenhouse in a direct heating cycle;

DESCRIPTION OF THE INVENTION

Figure 1:
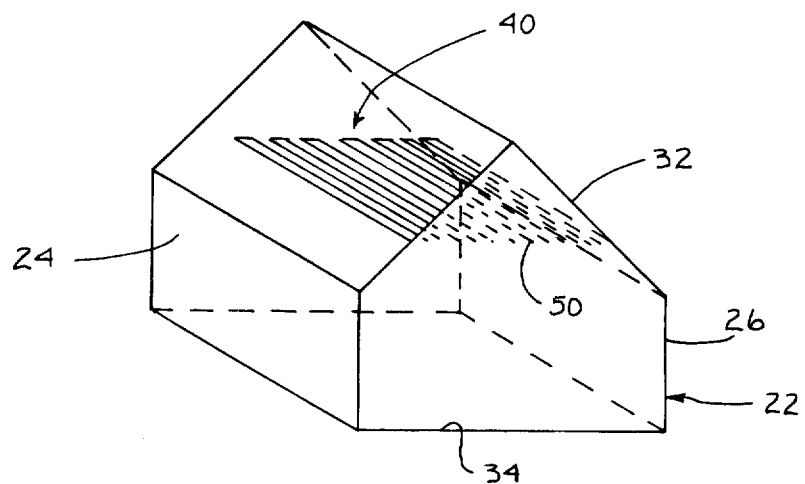
FIG. 1 is a pictorial view of a greenhouse provided with the black sheet plenum floor.
Figure 2:
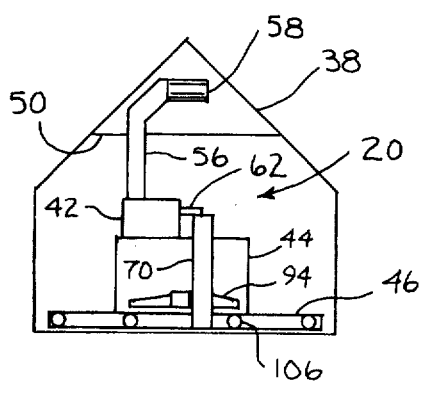
FIG. 2 is a view in front elevation of the greenhouse provided with the solar heating system of this invention.

The solar heating system of the invention is generally indicated by the reference numeral 20. It is shown installed in a greenhouse 22 in FIGS. 2 and 3 and partially installed in FIG. 1.

The greenhouse 22 is of conventional structure having the usual side walls 24 and 26, end walls 28 and 30 and roof 32 supported upon a floor 34. The roof 32 is peaked and is comprised of converging roof walls 36 and 38 forming a conventional triangular roof. The roof walls may be constructed of glass or translucent plastic as will be well understood in the art.

The solar heating system is comprised of a solar collector plenum 40 formed in the roof and appropriate duct work connecting it with an air directing means 42 and a thermal energy or heat storage chamber 44 for storage of solar heat from the solar collector plenum.

For distribution of hot air and exhaust air a hot air manifold 46 is connected to the air directing means while an exhaust tube 48 is connected to the heat storage chamber.

Figure 3:
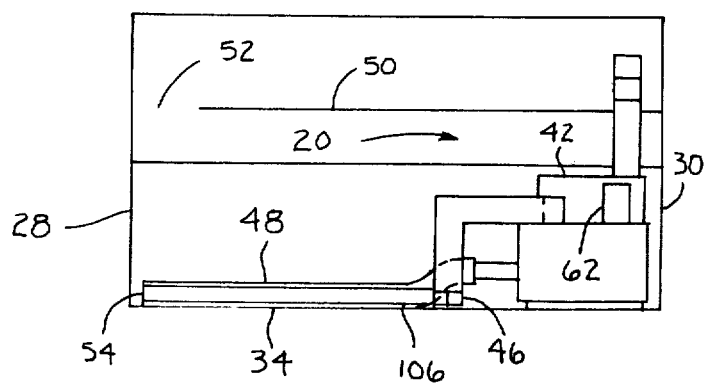
FIG. 3 is a side view of the greenhouse taken from the left side of FIG. 2.
Figure 4:
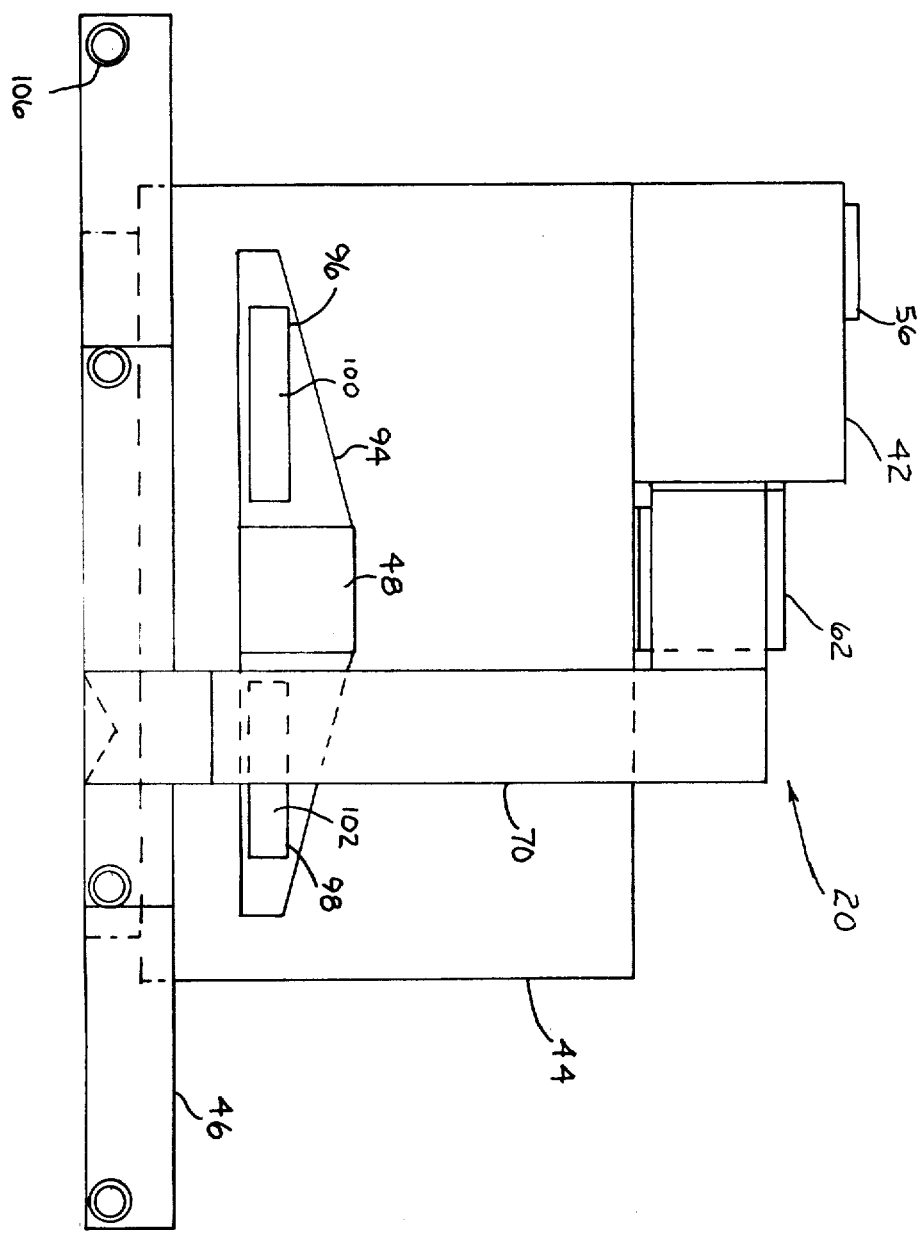
FIG. 4 is a view in front elevation of the solar heating distribution and storage unit.
Figure 5:
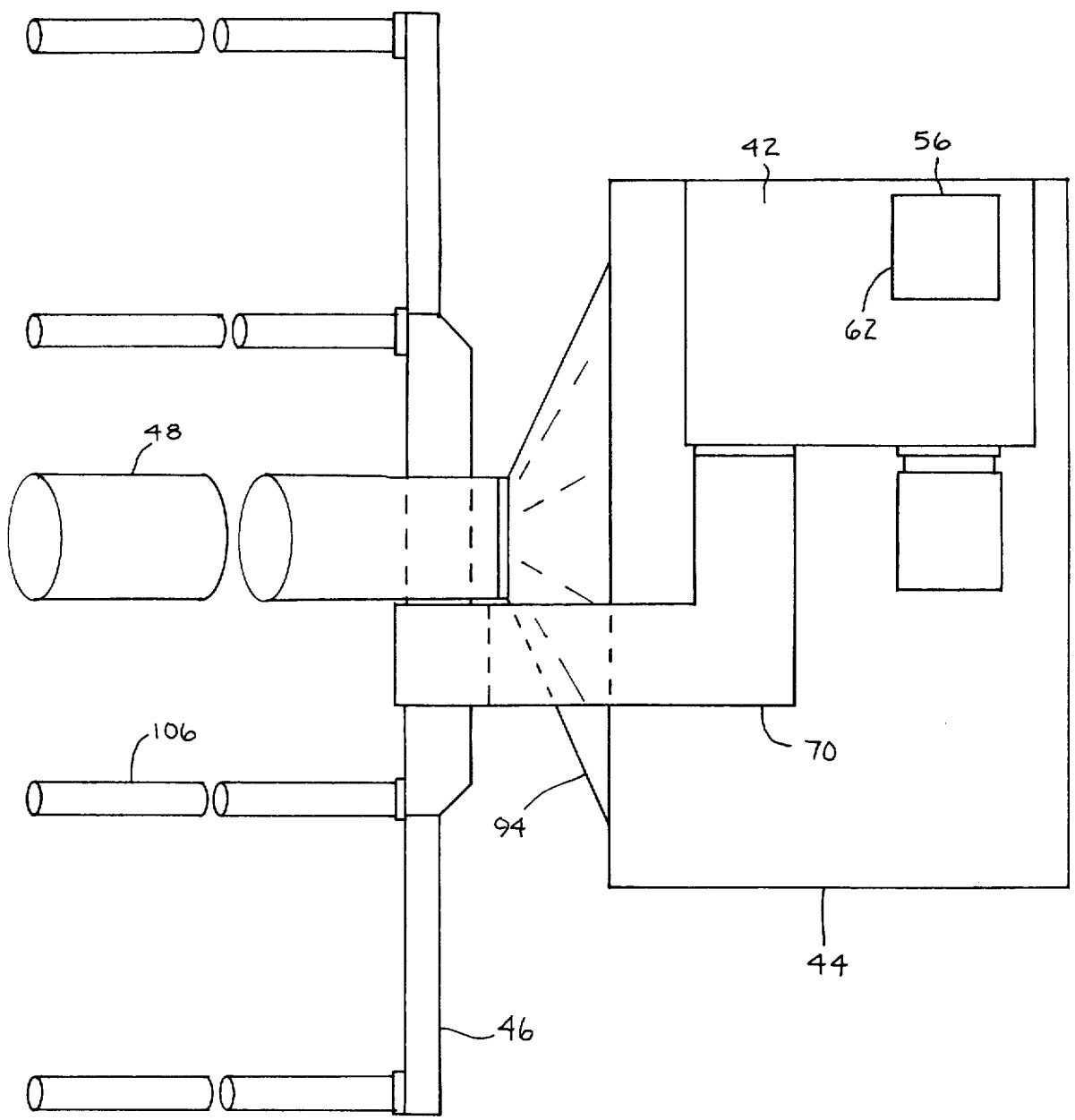
FIG. 5 is a top plane view of the solar heating unit.

The solar collector plenum is formed of the top portion of the roof walls 36 and 38 connected by black plastic sheet 50 of polyethylene or similar plastic sheeting material. The black plastic sheet forms a floor of the solar collector and acts to absorb radiant energy from the sun admitted through the translucent roof and forms an efficient, simple and inexpensive means for collecting the substantial amount of heat available in the unused top portion of the greenhouse. The black plastic sheet as will be well understood, may be simply supported where necessary by transverse wire supports extending from one side of the roof to the other. The plenum floor formed by the black plastic sheet is spaced as shown in FIG. 3 a short distance from the end wall of the greenhouse to provide an exhaust opening 52 for air directed from the solar collector plenum by the air directing means 42 through the heat storage chamber and out the exhaust tube 48 at an open end 54. The plenum opening is positioned substantially vertically above the end of the exhaust tube to provide for efficient utilization of unrecovered exhaust air and to prevent any unwanted heating of the greenhouse.

The air directing means is essentially a three way air control unit with a blower for directing air in a charge cycle from the solar collector plenum 40 to the heat storage chamber 44 when heat is desired to be stored as in a sunny daytime period when passive heat collection due to the translucent nature of the greenhouse walls is at a maximum. In a discharge cycle when heat is desired as in the nighttime the air directing means pulls cold air from the greenhouse through the heat storage chamber and directs it out the hot air manifold to heat the greenhouse. In a direct heat cycle when heat may be needed in the greenhouse the air directing means draws available hot air from the solar collector plenum and directs it to the hot air manifold 46 for distribution to needed areas of the greenhouse as will be more fully described hereinbelow and thereby bypasses the heat storage chamber.

The duct work connections to accomplish the aforementioned air distribution are best shown in FIGS. 2–4, 7 and 10. In order to provide for passing air from the solar collector plenum to the air directing means an upstanding duct 56 extends from the top of the air directing means into the solar collecting plenum. An opening 58 in this duct receives hot air and discharges into opening 60 in the air directing means. This duct provides for passage of air from the solar collector plenum through the air directing means in both the charge and direct heat cycles.

A duct 62 as shown in FIGS. 2, 3, 4, 5 and 10 provides for communication between the air directing means and the heat storage chamber through an opening 64 in the air directing means and a top opening 66 in the heat storage chamber. This duct provides for passage of air from the air directing means to the heat storage chamber in the charge and discharge cycles.

A duct 70 as shown in FIGS. 2–5 and 10 serves to communicate the air directing means with the hot air distribution manifold in the direct heat cycle. This is accomplished by duct openings 70 in the air directing means at the top of the duct while the lower end is connected to the hot air manifold.

The air directing means is simply a means for directing air through it to provide for change in air direction through the various charges, discharges and direct heat cycles. As an example, the air directing means may be that as shown in U.S. Pat. No. 4,262,655. The air directing means is shown in the various cycles in FIGS. 7, 8 and 9 for the charge, discharge and direct heat cycles, respectively.

The air directing means as shown in these Figures is comprised of a housing 74 having a blower fan 76 for forcing air in a controlled direction. The fan has an inlet opening 78 communicating with a semi-cylindrical valve 80 for opening and closing access to opening 60 leading to the solar collector plenum and opening 64 leading to the heat storage chamber opening 66. The semi-cylindrical valve operates on a horizontal axis to open and close the aforementioned openings from access to the inlet 78 of the fan.

An outlet opening 82 of the fan communicates with a second semi-cylindrical valve 84. This valve operates on a horizontal axis and opens and closes access to the opening 72 leading to the hot air manifold and the aforementioned opening 64 leading to the heat storage chamber.

Figure 6:
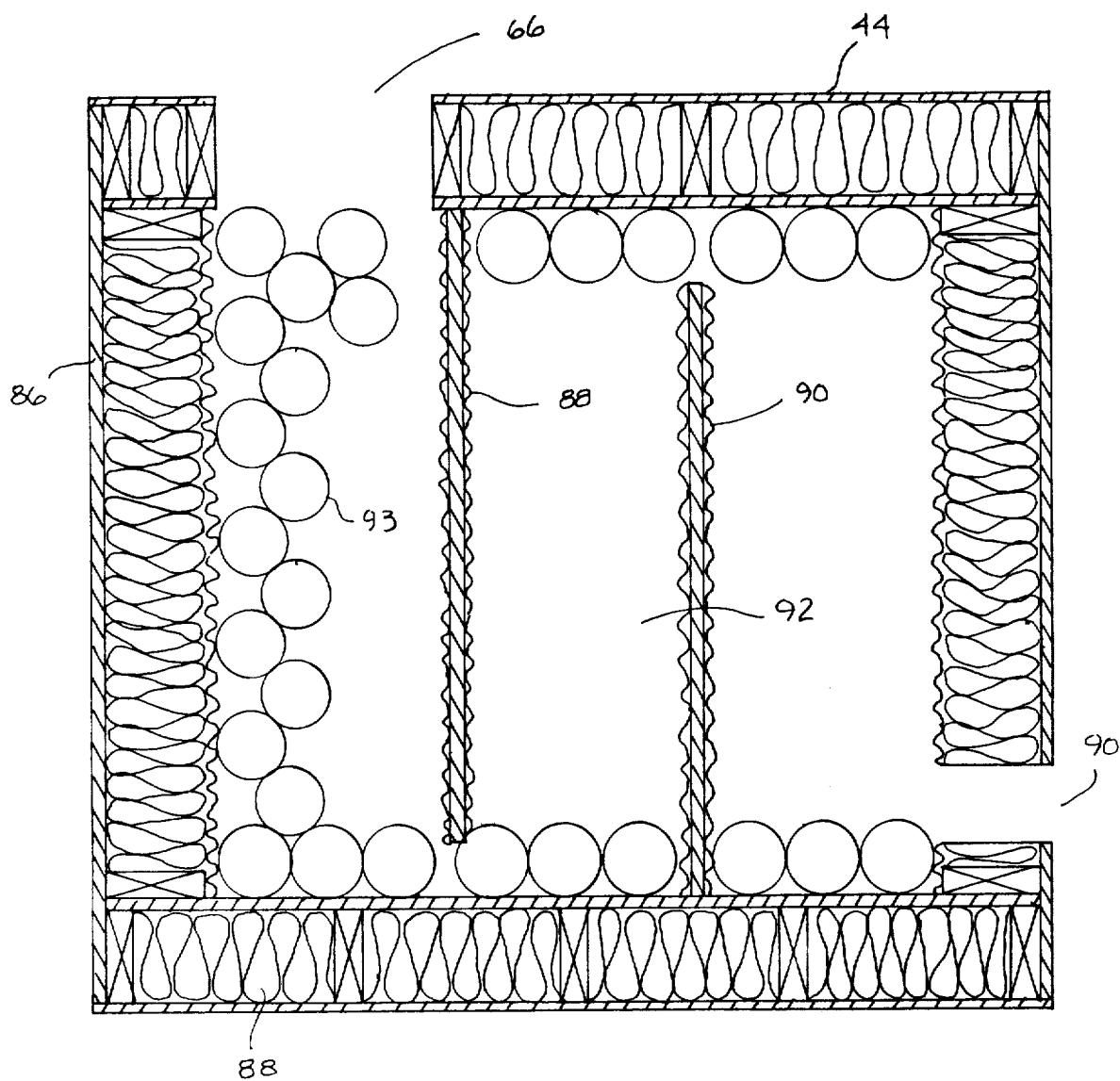
FIG. 6 is a view in vertical section of the heat storage unit.

The heat storage chamber is best shown in detail in FIG. 6. As there shown it is comprised of a box-like housing 86 having insulated walls 88. It is provided with the aforementioned opening communicating with the air directing means and a bottom opening 90 leading to the exhaust tube 48 and a damper controlled inlet port as will be more fully described hereinbelow. Staggered baffles 88 and 90 connected at the top and bottom of the interior of the housing provide a tortuous passage 92 within which are stored cylindrical containers 93 of a thermal energy storage material. These containers desirably may be of polyethylene tubes filled with a phase change material of calcium chloride hexahydrate as an example. This phase change material because of its melting point of about 81° F. to 27° C. provides a phase change latent heat storage capacity considerably greater than the sensible heat provided by rock or the like.

The bottom opening of the housing is covered by a plenum chamber 94 to which is connected the exhaust tube 48. This exhaust tube is constructed of flexible polyethylene which will distend or expand in the charge cycle when exhaust air is forced through the heat storage chamber and exhausted. In the discharge cycle the flexible exhaust tube will collapse and close.

Provision for admission of room air to be heated in the discharge cycle is made by inlet ports 96 and 98 in the plenum chamber 94. These ports are closed by simple sheet-like dampers 100 and 102 which open in the discharge cycle by suction or negative pressure created by the fan 76 in the air directing means and are closed by gravity or positive pressure in the other cycles.

The hot air manifold 46 is best shown in FIGS. 2-5 and 10. It is constructed of a transversely extending manifold chamber 104 closed at the end and connected to a plurality of heat distribution pipe-like conduits 106. The conduits are desirably of polyethylene or similar plastic material and are flexible in order that they may be flexed and positioned in desired areas on the greenhouse floor. The heat conduits 106 are closed at the ends and are provided with perforations (not shown) in order that heat may be distributed along their length. Through the flexible nature the conduits provide for distribution of heat and concentration in selected areas of the greenhouse where plants may be located that require more heat than in other areas. The flexible conduits may also be made collapsible when air is not forced therethrough in the discharge and direct heat cycles as desired.

OPERATION

The solar heating system of this invention is very simply employed. The air directing means and the heat storage chamber and the duct work necessary for heat distribution and collection can be furnished as a unitary package system. The heat conduits from the hot air manifold and the exhaust tube are simply positioned in the greenhouse in any placement configuration as desired.

The only construction required to fit the configuration of the greenhouse is the emplacement of the black plastic plenum floor sheet 50 which stretches from one side of the roof to the other. The plastic sheet is simply supported by appropriate affixation to the roof walls and may be supported where desired upon stringers of wire or the like. After such support the plenum duct 56 is fitted through a cut-out opening in the plenum floor and the exhaust opening is cut at an end of the greenhouse remote from the central unit comprised of the air directing means and the heat storage chamber and the connecting duct work and the hot air distribution manifold.

In operation the solar heating system can be simply and efficiently changed between the various charge, discharge and direct heat cycles. This change may be manually effected or by appropriate instrumentation that may sense the heat load requirements depending on the various temperatures in the ambient air outside the greenhouse, the weather and sun conditions, the temperature within the solar collector plenum and heat storage chamber and at various points within the greenhouse.

Figure 10:
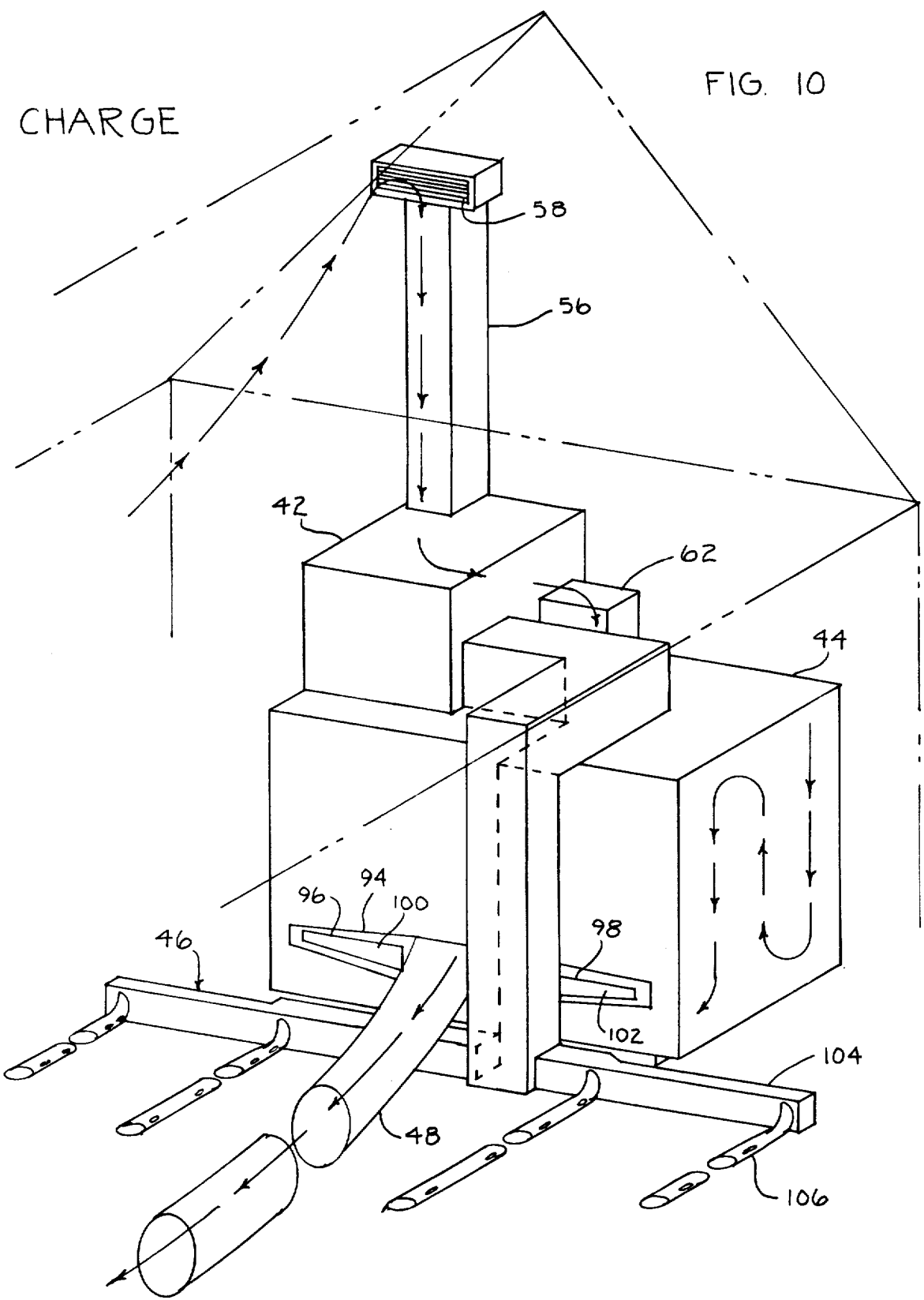
FIG. 10 is a pictorial view of the solar heating distribution and storage unit for distribution of solar heated air to the heat storage unit in the charge cycle.
Figure 11:
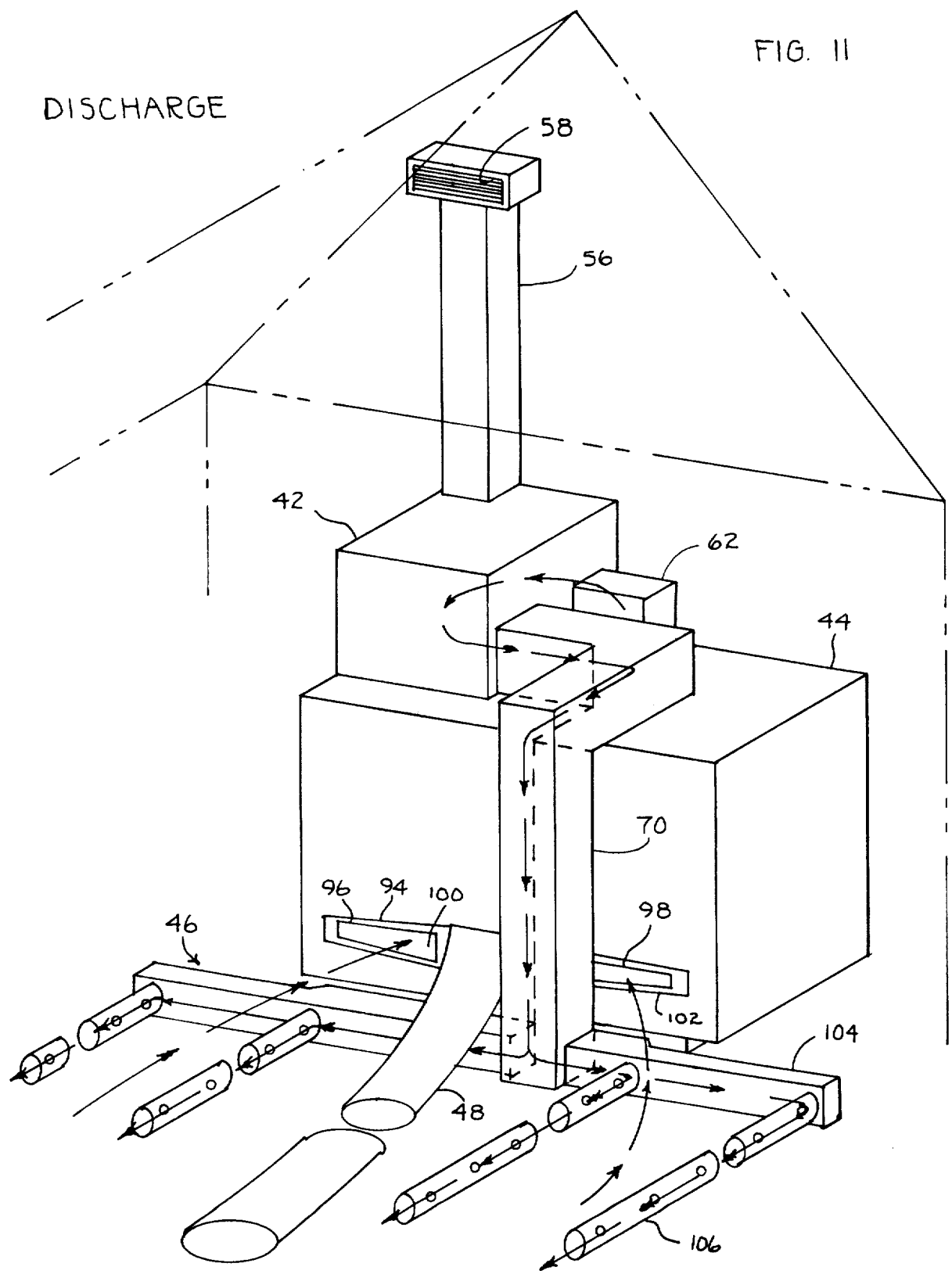
FIG. 11 is a view similar to FIG. 10 showing distribution of heated air from the heat storage unit to the greenhouse in a discharge cycle.

When the charge cycle is desired to be employed the air directing means is operated as shown in FIG. 7 to provide the direction of flow as shown by the arrows therein and in FIG. 10. In this cycle hot air from the plenum is drawn through duct 56 through opening 60 past valve 80 in the air directing means by the fan 76 and is forced past valve 84 through opening 62 into the heat storage chamber 44. The phase change containers 93 are heated and air is exhausted through the flexible exhaust tube 48 out the end and back to the plenum chamber through the exhaust opening 52.

In the discharge cycle negative pressure or suction from the air directing fan causes the dampers 100 and 102 to open and air from the greenhouse floor area to be admitted through ports 96 and 98 and the opening 90 in the heat storage chamber to be drawn therethrough to be heated. The heated air from the heat storage chamber is then drawn through the top opening 66 into the duct 62 and the opening 64 in the air directing means 42 past valve 80 by the blower fan and is then forced past valve 84 through duct 70 to the hot air manifold. The hot air in the manifold is then discharged through the hot air distribution conduits to desired areas in the greenhouse for heating.

Figure 12:
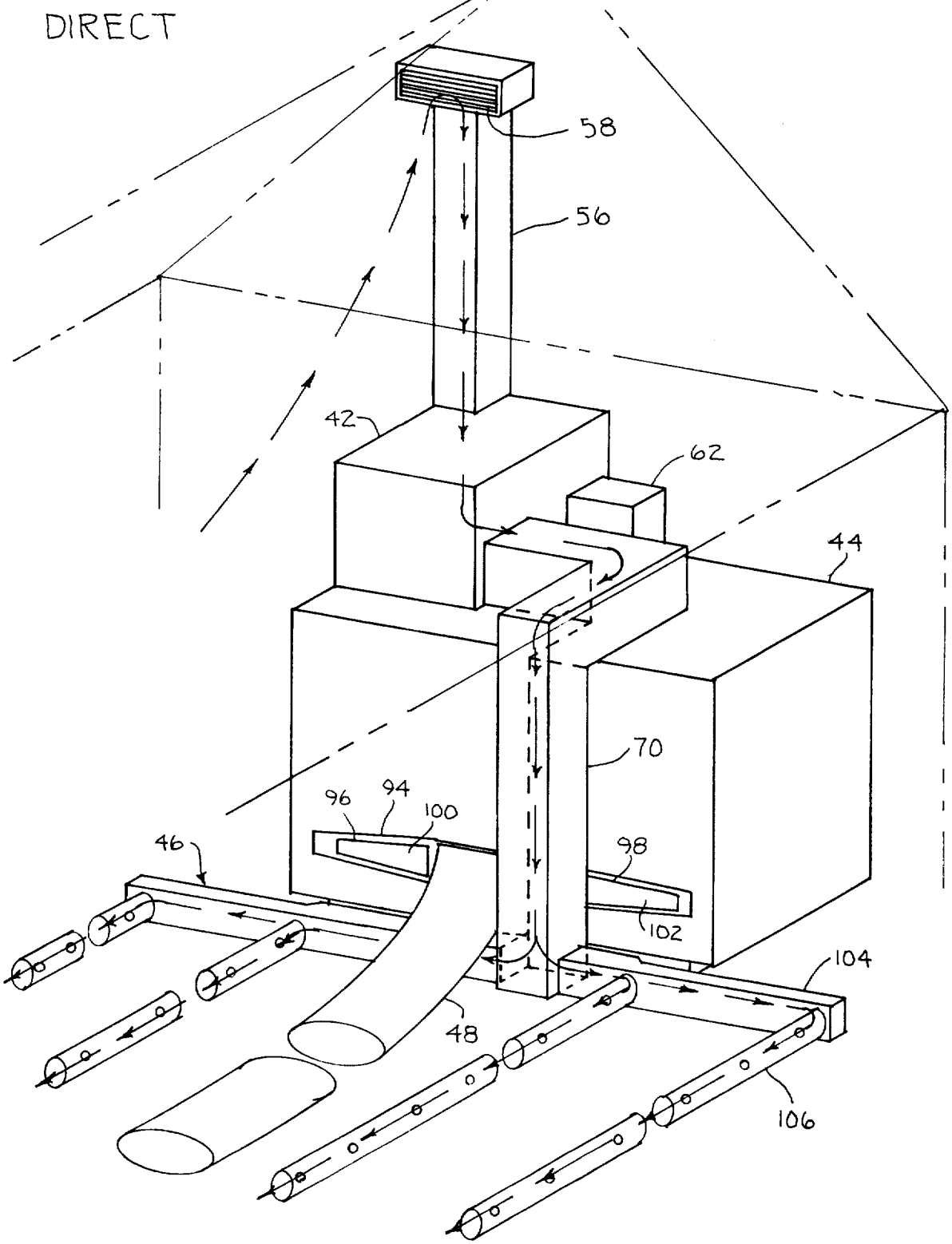
FIG. 12 is a view similar to FIG. 10 showing distribution of solar heated air to the greenhouse in a direct heating cycle.

In the direct heat cycle hot air from the solar collector plenum is drawn by the blower fan through duct 56 into the opening 60 of the air directing means past valve 80 into the fan inlet as shown in FIGS. 7 and 12. The fan forces under positive pressure the hot air past valve 84 through opening 72 into duct 70 and the hot air manifold for distribution to the selected areas of the greenhouse through the flexible heating conduits 106. Hot air rising in the greenhouse is recycled back to the solar collector plenum through the plenum opening 52 to complete the cycle.

While this invention has been described in particular reference to a greenhouse, it will be understood that similar buildings with translucent walls or portions thereof may be similarly equipped. Likewise the solar heat distribution system employing the air directing means, the solar heat storage chamber and the flexible exhaust and hot air manifold with flexible heat distribution conduits or tubes may be employed with various types of solar collectors.

Various other changes and modifications may be made within this invention as will be readily apparent to those skilled in the art. Such changes and modifications are within the scope and teaching of this invention as defined by the claims appended hereto.

What is claimed is:

1. A solar heating system for greenhouses and the like having a translucent roof, said system comprising a black plastic sheet spaced below an upper portion of said translucent roof and extending transversely under the roof in spaced relation thereto to define with the roof a substantially enclosed plenum to provide a solar collection space for hot air generated therein by solar energy, said black plastic sheet forming a floor of the roof plenum and a ceiling for a greenhouse space to be heated below, a solar integral self-contained heat storage chamber supported upon a floor of the greenhouse, air directing means supported within a housing connected to and supported upon said chamber for selectively directing;
   (a) hot air from said roof plenum to said solar heat storage chamber in a charge cycle,
   (b) hot air from said roof plenum to a greenhouse space to be heated in a direct heat cycle and,
   (c) hot air from said solar heat storage chamber to a greenhouse space to be heated in a discharge cycle, the solar heat storage chamber being provided with means for directing hot air therefrom to a hot air manifold to direct hot air to selected floor areas of the greenhouse to provide heat thereto, said manifold being comprised of a laterally extending conduit supported above the floor of the greenhouse and communicating with a plurality of longitudinally extending flexible heat distribution conduits extending along and supported by the floor of the greenhouse, said flexible conduits being moveable to said selected areas to provide variable heat thereto as desired.

2. The solar heating system of claim 1 in which the solar heat storage chamber is provided with means for exhausting air directed therethrough to an interior area of the greenhouse positioned substantially vertically underneath an opening in said black plastic sheet to provide for recycling of air to said roof plenum.

3. The solar heating system of claim 2 in which said means for exhausting air from the solar heat storage chamber comprises a flexible collapsible plastic exhaust conduit means provided in communication with said heat storage chamber, said exhaust conduit being distendible by a positive air pressure to provide for passage of exhaust air therethrough in the charge cycle and collapsible in the discharge and direct heat cycles, said conduit being collapsible by a negative pressure and its own weight in the discharge cycle and by its own weight in the direct heat cycle, said conduit means having an opening positioned substantially vertically underneath the opening in said black plastic sheet.

4. The solar heating system of claim 1 in which said heat distribution conduits are comprised of perforate flexible collapsible plastic tubes, said tubes being distendible in said discharge and direct heating cycles and collapsible in the charge cycle.

5. The solar heating system of claim 1 in which a flexible collapsible plastic exhaust conduit means is provided in communication with said heat storage chamber, said exhaust conduit being distendible by a positive air pressure to provide for passage of exhaust air therethrough in the charge cycle and collapsible in the discharge and direct heat cycle, said conduit being collapsible by a negative pressure and its own weight in the discharge cycle and by its own weight in the direct heat cycle.

6. The solar heating system of claim 1 in which said solar heat storage chamber is comprised of staggered vertically extending baffle members spaced from one another and provided with alternate openings on a top and bottom of said chamber to provide a tortuous passageway between said first and second opening, said passageway being substantially filled with elongate horizontally extending cylindrical containers of a phase change material to provide a thermal energy storage chamber.

7. The solar heating system of claim 1 in which said roof is comprised of converging translucent roof walls and said black plastic sheet extends between said walls to form the floor of said roof plenum and the ceiling for the greenhouse space to be heated below.

* * * * *